(12) United States Patent
Williamson (10) Patent No.: US 9,910,690 B2
(45) Date of Patent: Mar. 6, 2018

(54) PCI SLOT HOT-ADDITION DEFERRAL FOR MULTI-FUNCTION DEVICES

(71) Applicant: Red Hat, Inc., Raleigh, NC (US)

(72) Inventor: Alex Williamson, Fort Collins, CO (US)

(73) Assignee: Red Hat, Inc., Raleigh, NC (US)

( * ) Notice: Subject to any disclaimer, the term of this patent is extended or adjusted under 35 U.S.C. 154(b) by 39 days.

(21) Appl. No.: 14/948,021

(22) Filed: Nov. 20, 2015

(65) Prior Publication Data

US 2017/0147370 A1    May 25, 2017

(51) Int. Cl.
G06F 9/455    (2006.01)
G06F 13/42    (2006.01)

(52) U.S. Cl.
CPC ...... *G06F 9/45558* (2013.01); *G06F 9/45545* (2013.01); *G06F 13/4282* (2013.01); *G06F 2009/45579* (2013.01)

(58) Field of Classification Search
None
See application file for complete search history.

(56) References Cited

U.S. PATENT DOCUMENTS

| | | |
|---|---|---|
| 6,820,164 B2 | 11/2004 | Holm et al. |
| 7,743,189 B2 | 6/2010 | Brown et al. |
| 8,086,765 B2 | 12/2011 | Turner et al. |
| 8,473,947 B2 | 6/2013 | Goggin et al. |
| 9,063,767 B2 | 6/2015 | Sahota et al. |
| 2006/0253619 A1* | 11/2006 | Torudbakken ...... G06F 13/4022 710/31 |
| 2009/0006710 A1* | 1/2009 | Daniel ................ G06F 9/45558 710/315 |

(Continued)

OTHER PUBLICATIONS

Levasseur et al., "Standardized but Flexible I/O for Self-Virtualizing Devices", https://www.usenix.org/legacy/event/wiov08/tech/full_papers/levasseur/levasseur_html/, Netronome Systems, Georgia Tech, retrieved on Sep. 11, 2015, 7 pages.

(Continued)

*Primary Examiner* — Dong Kim
(74) *Attorney, Agent, or Firm* — Lowenstein Sandler LLP (57) ABSTRACT

A hypervisor receives a request pertaining to a multi-function device managed by the hypervisor from a guest operating system of a virtual machine where the multi-function device comprises a main function and a plurality of sub-functions and the request identifies an address within a configuration space associated with one of the plurality of sub-functions of the multi-function device. The hypervisor determines the main function of the multi-function device in view of the address of the configuration space associated with the sub-function, accesses a data structure associated with the main function to obtain an indicator of availability of the main function to the guest operating system, and determines, view of the indicator of availability, whether the main function is available to the guest operating system. Responsive to determining that the main function is not available, the hypervisor rejects the request from the guest operating system to access the address within the configuration space associated with the sub-function.

20 Claims, 8 Drawing Sheets

(56) References Cited

U.S. PATENT DOCUMENTS

| | | | |
|---|---|---|---|
| 2009/0113430 A1* | 4/2009 | Riley | G06F 9/468 |
| | | | 718/101 |
| 2011/0321158 A1* | 12/2011 | Craddock | G06F 9/45558 |
| | | | 726/20 |
| 2012/0036306 A1* | 2/2012 | Miyoshi | G06F 13/102 |
| | | | 710/316 |
| 2012/0102491 A1 | 4/2012 | Maharana | |
| 2013/0160002 A1* | 6/2013 | Graham | G06F 9/45558 |
| | | | 718/1 |
| 2015/0052281 A1* | 2/2015 | Hart | G06F 13/16 |
| | | | 710/308 |
| 2015/0149996 A1 | 5/2015 | Tsirkin et al. | |
| 2016/0283425 A1* | 9/2016 | Sarangdhar | G06F 13/362 |

OTHER PUBLICATIONS

"Xen PCI Passthrough", http://wiki.xenproject.org/wiki/Xen_PCI_Passthrough, Xen Project, A Linux Foundation Collaborative Projects, last modified on Jan. 28, 2015, retrieved on Sep. 11, 2015, 13 pages.

"Xilinx Answer 57342 Virtex-7 FPGA Gen3 Integrated Block for PCI Express core SRIOV Example Design Simulation", http://www.xilinx.com/Attachment/Xilinx_Answer_57342_SRIOV_simulation.pdf, 2012, 26 pages.

* cited by examiner

PCI SLOT HOT-ADDITION DEFERRAL FOR MULTI-FUNCTION DEVICES

TECHNICAL FIELD

The present disclosure is generally related to computer systems, and more particularly, to managing PCI multi-function devices in virtualized computer systems.

BACKGROUND

A virtual machine (VM) is a portion of software that, when executed on appropriate hardware, create an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system" (or "guest OS").

In a virtualized environment, physical devices, such as network devices or video cards, can be made available to guests by the hypervisor using a process known as device assignment. Physical Peripheral Component Interconnect (PCI) adapters are a collection of physical devices that may include one or more interconnected devices, such as bridges and switch ports, as well as one or more endpoint functions such as a Network Interface Controller (NIC), Host Bus Adapter (HBA), Universal Serial Bus (USB) port, Graphics Processing Unit (GPU), etc. Multiple PCI devices may be packaged together into a physical device on a PCI bus, referred to as a "multi-function" device.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for PCI slot hot-addition deferral for multi-function devices. The PCI specification describes the process fair system software to discover that multiple functions can exist is to scan multi-function device at an address location associated with the main function of the device. For PCI, PCI Express, and PCI-X devices, this location is referred to as function number zero. Information in the configuration space associated with the main function of the physical device can indicate that multiple additional sub-functions exist for the device, thereby indicating that the device is a multi-function device.

In a virtualized environment, devices may be added to a host computer via a "hot add", where the device is added while a virtual machine is running. When a multi-function device is hot added to a computer system, all sub-functions of the multi-function device are effectively added simultaneously. That is, if the main function (function number zero) is available and indicates multi-function support, the additional sub-functions are also "available" since they are all part of the same physical package. In a virtualized environment multi-function device may be exposed by a hypervisor as a collection of separate devices. The hypervisor can expose each device as a separate function into the VM PCI configuration address space independently. Hot-addition of a virtual adapter composed of independent components may therefore be bound to the PCI specification that sub-functions (functions other than the function zero) should be in place at the time the VM attempts to access the function zero address space.

Typically, a VM adhering to the PCI standard should not access a sub-function prior to the main function becoming available to the VM. However, it is possible for system software executed by the guest OS of the VM to scan and discover sub-functions of a multi-function device independently while the hypervisor is process of preparing the device to be used by the guest OS of the VM (e.g., when constructing a virtual adapter for the device to be exposed to the VM that emulates the device in the VM for the guest OS). For example, if the hypervisor initializes the main function of a multi-function device, a VM could scan the configuration space of the main function, determine that sub-functions are associated with the main function, and attempt to access the sub-functions before those sub-functions have been initialized by the hypervisor. This can result in the guest OS of the VM experiencing initialization errors as well as present synchronization problems for the hypervisor since it will not be able to effectively determine when the entire multi-function device has become "visible" to the VM.

Additionally, if the hypervisor initializes the sub-functions before initializing the main function, a VM could still attempt to scan specific configuration address space locations of the sub-functions. Thus, while a PCI-compliant VM should scan the main function configuration space first to determine if any sub-functions are present (e.g., by determining if a particular bit in the main function configuration space is set to a value that indicates that the device is a multi-function device), a non-PCI-compliant VM could attempt access of the configuration space associated with the sub-functions even though it has no indication that the sub-functions are even present.

Aspects of the present disclosure address the above noted and other deficiencies by implementing PCI slot hot-addition deferral for multi-function devices. The hypervisor can initialize the configuration spaces of the main function and sub-functions of a multi-function device, but while the initialization process is in progress, intercept any attempts to scan or otherwise access any configuration space address associated with the device. The hypervisor can create and use a data structure that indicates when the main function and all sub-functions have been fully initialized and are ready to be exposed to the guest OS of the VM. If the data structure indicates the multi-function device is not available (e.g., the initialization process has not yet completed for all sub-functions), the hypervisor may return a response to the requesting guest OS that indicates the address requested by the guest OS is not associated with a valid device. This can significantly reduce device configuration failures while still allowing individual sub-functions of a multi-function device to be configured independently of each other.

In an illustrative example, a hyper visor can receive a request to add a multi-function device to a virtual machine. A device may be a physical device added to a host environment to be exposed to a guest OS of a virtual machine. A multi-function device may be a physical device that combines more than one functional component in a single physical device. For example, a multi-function device may be a single physical device that combines an audio card, a video card, a Universal Serial Bus (USB) port, a Graphical Processing Unit (GPU), etc. together on the same physical device. A multi-function device may also be a physical device that provides a Network Interface Controller (NIC) that possesses more than one channel, thereby providing the capabilities of multiple NICs on a single device. A multi-function device may include a combination of any of the above listed functional components or other additional functional components that may be added to a host system. In some implementations, the multi-function may be a Peripheral Component Interconnect (PCI) device, a Peripheral Component Interconnect Express (PCI Express) device, or the like.

Multi-function devices can include a main function that controls one of the functional components of the device. In implementations where the device is a PCI or PCI Express device, the main function may be referred to as function number zero. Multi-function devices may include additional sub-functions that each control the additional functional components of the device. In implementations where the device is a PCI or PCI Express device, the multi-function device may include up to 7 sub-functions.

Multi-function devices may be accessed using a configuration space associated with the device. In implementations where the multi-function device is a PCI device, the configuration space may be a PCI configuration space. In implementations where the multi-function device is a PCI express device, the configuration space may be a PCI express extended configuration space. PCI configuration space is typically made up of a set of registers that is used by PCI or PCI Express-based motherboards to perform configuration of the peripheral device cards inserted into a PCI bus of the motherboard. PCI devices have a set of registers referred to as a configuration space and PCI Express introduces extended configuration space for peripheral devices. Configuration space registers are mapped to device functions. Device drivers and diagnostic software may access the configuration spaces and operating systems may have APIs to permit access to device configuration space.

PCI or PCI Express configuration space refers to a set of 256 bytes that are addressable by utilizing the 8-bit PCI bus, 5-bit device, and 3-bit function numbers for the device (commonly referred to as the BDF [bus/device/functional]). This permits up to 256 buses, each with up to 32 devices, each supporting 8 functions. A single PCI multi-function device can respond as a device and may implement at least a function number zero. The first 64 bytes of configuration space are standardized; the remainder is available for vendor-defined purposes.

In some implementations, the request to add the device may, be received from a hypervisor administrator via a management system interface for the hypervisor. Alternatively, the request may be received from another component of the system. The hypervisor may then create a data structure associated with the main function of the multi-function device. The data structure may contain an availability indicator value for the main function of the multi-function device, an identifier for the virtual machine executing the guest OS (e.g., the process identifier for the VM) that may be granted access to the device, a unique identifier for the virtual device, the device type, or any similar information. In some implementations, the hypervisor may create a single data structure for the multi-function device that stores information for the main function and the sub-functions together. Alternatively, the hypervisor may create a data structure for the main function that also includes references to separate data structures for each sub-function. The data structure may be maintained in hypervisor accessible memory, a shared memory space, stored in a storage device, or in any similar manner.

The hypervisor may set an availability indicator in the data structure associated with the main function that indicates that the main function is not available to a guest OS of the virtual machine. In some implementations, when the data structure is created for the device, the hypervisor may create the availability indicator for the device with a default value that indicates that the main function is not available. For example, the availability indicator may be set to "N", "not available", "0", or the like. The availability indicator value may be numeric (e.g., "0", "1", etc.), alphanumeric (e.g., "Y", "N", etc.), a string value (e.g., "available", "not available", etc.), or the like.

The hypervisor may then initialize the configuration space associated with the multi-function device. In some implementations, the hypervisor may first initialize the main function (e.g., function number zero for PCI and PCI express devices) of the multi-function device. To initialize the main function, the hypervisor may create a configuration space associated with the main function of the multi-function device. The configuration space may be created in hypervisor memory that can then be made available to the guest OS of the virtual machine for use in accessing the multi-function device.

Once the configuration space has been created, the hypervisor may then associate the main function (e.g., the PCI function number zero) with a virtual PCI bus to be exposed to the virtual machine. In some implementations, the hypervisor may configure the configuration space so that a VM attempt to access the multi-function device via a virtual PCI bus can reference the allocated configuration space for that device in hypervisor memory. The hypervisor may then associate the virtual PCI bus with the virtual machine. In some implementations, each function (e.g., the main function and each sub-function) of a multi-function device may be associated with an initialization callback component (e.g., a PCI callback function component) that is executed upon successful completion of the initialization of the function. The hypervisor may determine that initialization of the main function has completed responsive to successful execution of the initialization callback component.

The hypervisor may then initialize the plurality of sub-functions associated with the main function of the multi-function device. As noted above, PCI multi-function devices may have a function zero (the main function) and up to seven additional functions (sub-functions), for a total of eight functions for the device. The hypervisor may create an additional configuration space for each of the plurality of sub-functions for the multi-function device in a manner similar to that described above for the main function. Alternatively, the hypervisor may create a single configuration space shared among the additional sub-functions. The hypervisor may create the configuration spaces serially (one at time) or in parallel (simultaneously). Once a configuration space has been created for a sub-function, the hypervisor may associate the sub-function with the PCI bus associated with the main function to be exposed to the VM.

While initializing the configuration space for the multi-function device, the hypervisor may receive a request pertaining to the multi-function device managed by the hypervisor from the guest OS of the virtual machine. In some innplementations, the request may be a request to access the multi-function device. Additionally or alternatively, the request may identify an address within a configuration space associated with one of the plurality of sub-functions of the multi-function device. For example, the guest OS may initiate a scan of an address of hypervisor memory that includes one of the sub-functions of the multi-function device (e.g., a PCI scan of the address locations associated with a PCI bus).

Responsive to receiving the request, the hypervisor may determine whether the multi-function device is available to the guest OS. The hypervisor may first determine the main function of the multi-function device associated with the address of the configuration space of the sub-function. In implementations involving a PCI multi-function device, the hypervisor may determine the function number zero of the PCI multi-function device associated with the address space of the sub-function. For example, if the hypervisor received a request from the guest OS pertaining to the first sub-function of a PCI multi-function device, it would then determine the function number zero for that device. The hypervisor may make this determination by using the BDF for the sub-function and modifying the 3 bits of the function number portion of the BDF to determine the address of the function number zero.

The hypervisor may then access the data structure associated with the main function of the multi-function device to obtain the indicator of availability of the main function to the guest OS. In some implementations, the hypervisor may access the data structure using the address location of the main function as the index to the data structure to identify the proper data structure entry. The hypervisor may then determine, using the availability indicator, whether the main function is available to the guest OS. If the hypervisor is still in the process of initializing the sub-functions associated with the main function, the availability indicator may be set to a value indicating that the main function is not available to the guest OS of the VM. For example, as noted above, the availability indicator may be set to "N", "not available", "0", or the like.

Responsive to determining that the main function is not available (in view of the value of the availability indicator), the hypervisor may reject the request from the guest OS to access the address within the configuration space associated with the sub-function. The hypervisor may reject the request by sending an error code in an API, sending a direct message to the guest OS, returning a null address, or in any similar manner. In implementations using a PCI or PCI Express multi-function device, the hypervisor may return a response to the guest OS that simulates no response from the applicable PCI or PCI Express BDF address location indicating that no device is present at that BDF address). For example, the hypervisor may return an "all-bits-on" value ('FFFFFFFF' in hexadecimal) to the guest OS. The guest OS can interpret this response as if no device is available (e.g., no valid configuration space has been initialized) at the requested address location.

The hypervisor may continue with the initialization of the plurality of sub-functions for the multi-function device until all sub-functions have been successfully initialized. The hypervisor may determine that initialization of the plurality of sub-function has completed responsive to successful execution of the corresponding initialization callback component for each of the sub-functions. Responsive to determining that initialization of the plurality of sub-functions has completed, the hypervisor may set the availability indicator in the data structure associated with the main function to a value that indicates that the main function is now available to the guest OS. The hypervisor may then set the availability indicator by modifying a flag in a data field of the data structure from "N" (not available) to "Y" available, modify a bit value from "0" (not available) to "1" (available), or in any similar manner.

In some implementations, the hypervisor may then send a notification to the guest OS that the main function is available. The hypervisor bear send the notification via an interrupt request, a message written to a data structure in a shared memory location, or in any similar manner. In some implementations, the hypervisor may send a PCI hotplug signal to the guest OS to notify the guest OS that a PCI multi-function device has been added to the VM. The guest OS, responsive to receiving the notification, may then send a request identifying an address within the configuration space of the multi-function device (e.g., the main function or one of the sub-functions). Responsive to receiving this request, the hypervisor may then access the data structure associated with the main function of the device to determine whether the device is available as noted above. Responsive to determining that the main function is available, the hypervisor may allow the guest OS to access the address within the configuration space associated with the requested main function or sub-function.

In some implementations, the hypervisor may wait to update the availability indicator and hold a notification to the guest OS that the multi-function device is available until performance criteria has additionally been satisfied. In these implementations, once the hypervisor has completed initialization of the main function and sub-functions of the multi-function device, the hypervisor may first identify performance criteria associated with the virtual machine that indicates when the main function can be made available to the virtual machine. For example, the hypervisor may determine that the guest OS should only have access to the multi-function device after the VM has been restarted (e.g., after a scheduled maintenance cycle, after a scheduled downtime, etc.), during period where the load point of the VM is measured as comparatively low (e.g., when the CPU utilization of the VM is comparatively low), upon completion of a boot cycle (e.g., the VM is not currently booting up), or the like. In some implementations, the performance criteria may be stored in a data structure associated with the VM. Alternatively, the performance criteria may be stored in the data structure associated with the main function of the multi-function device along with the availability indicator.

Responsive to determining that the performance criteria have been satisfied (e.g., the VM has restarted, the CPU utilization rate is low, the VM is not currently booting up, etc.), the hypervisor may then set the availability indicator in the data structure associated with the main function to a value that indicates that the main function is available to the guest OS. The hypervisor may then send the notification to the guest OS that the main function is available to the guest OS as described above.

Aspects of the present disclosure are thus capable of facilitating PCI slot hot-addition deferral for multi-function devices. More particularly, aspects of the present disclosure can allow inter-dependencies between devices exposed as sub-functions within a multi-function PCI device to be resolved by the hypervisor prior to exposing the main function to the VM. Additionally, aspects of the present disclosure can significantly reduce device configuration failures while still allowing individual sub-functions of a multi-function device to be configured independently of each other.

Figure 1:
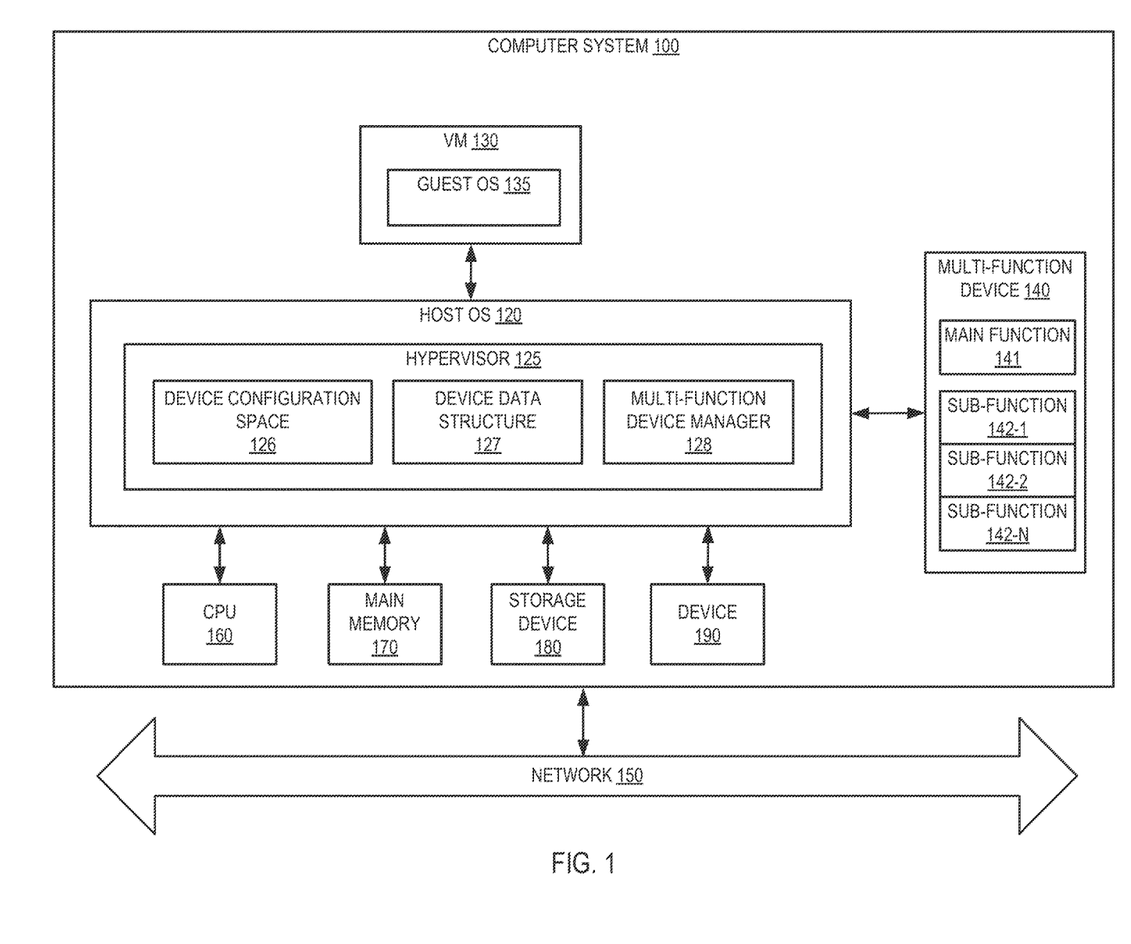
FIG. 1 depicts a high-level component diagram of an example computer system architecture, in accordance with one or more aspects of the present disclosure.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 is connected to a network 150 and comprises one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), one or more devices 190 (e.g., a Peripheral Component Interconnect [PC] device, network interface controller (NIC), a video card, an device, etc.), and one or more multi-function devices 140 (e.g., a multi-function PCI device that includes multiple functional components in a single physical device).

Multi-function device 140 can include a main function 141 (e.g., a PCI function number zero) that represents the main functional component of the multi-function device. For example, in a PCI or PCI Express multi-function device, the main function 141 may be a NIC, HBA, GPU. USB port, or any similar PCI compliant functional component. Multi-function device 140 may also include one or more sub-functions 142-1, 142-2, to 142-N. For example, in a PCI or PCI Express multi-function device, each of sub-functions 142-1 through 142-N may be additional PCI compliant functional components that are combined with the main function 141 into the same physical device.

In certain implementations, main memory 170 may be non-uniform access (NUMA), such that memory access time depends on the memory location relative to CPU 160. It should be noted that although, for simplicity, a single CPU 160, storage device 180, and device 190 are depicted in FIG. 1, other embodiments of computer system 100 may comprise a plurality of CPUs, storage devices, and devices.

The computer system 100 may be a server a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 may additionally comprise one or more virtual machine (VM) 130 and host operating system (OS) 120. VM 130 is a software implementation of a machine that executes programs as though it was an actual physical machine. Host OS 120 manages the hardware resources of the computer system and provides functions such as inter-process communication, scheduling, memory management, and so forth.

VM 130 may comprise a guest operating system (OS) 135 that handles the execution of applications within the virtual machine. Guest OS 135 may send requests to hypervisor 125 to access multi-function device 140 by scanning portions of device configuration space 126 in hypervisor memory. It should be noted that although, for simplicity, a single VM 130 is depicted in FIG. 1, computer system 100 may host a plurality VMs 130.

Host OS 120 may comprise a hypervisor 125, which provides a virtual operating platform for VMs 130 and manages their execution. Hypervisor 125 may additionally include device configuration space 126, device data structure 127, and multi-function device manager 128. It should be noted that in some alternative implementations, hypervisor 125 may be external to host OS 120, rather than embedded within host OS 120, or may replace host OS 120.

Multi-function device manager 128 can facilitate PCI slot hot-addition deferral for multi-function devices, as described in detail below with respect to FIGS. 4-7. Multi-function device manager 128 may create the configuration space for the main function 141 and sub-functions 142-1 through 142-N in device configuration space 126. Multi-function device manager 128 may create the data structure (s) associated with the main function 141 and sub-functions 142-1 through 142-N in device data structure 127. Device data structure 127 may include an identifier for VM 130 executing guest OS 135, an identifier for multi-function device 140, an availability indicator for the main function 141 and sub-functions 142-1 through 142-N, or any similar information. An example of a data structure stored device data structure 127 is depicted below with respect to FIG. 3. Device configuration space 126 can be an area of hypervisor memory accessible to multi-function device manager 128. Device data structure 127 can be an area of hypervisor memory accessible to multi-function device manager 128, a shared memory space, a data structure saved in storage device 180, or the like.

Figure 2:
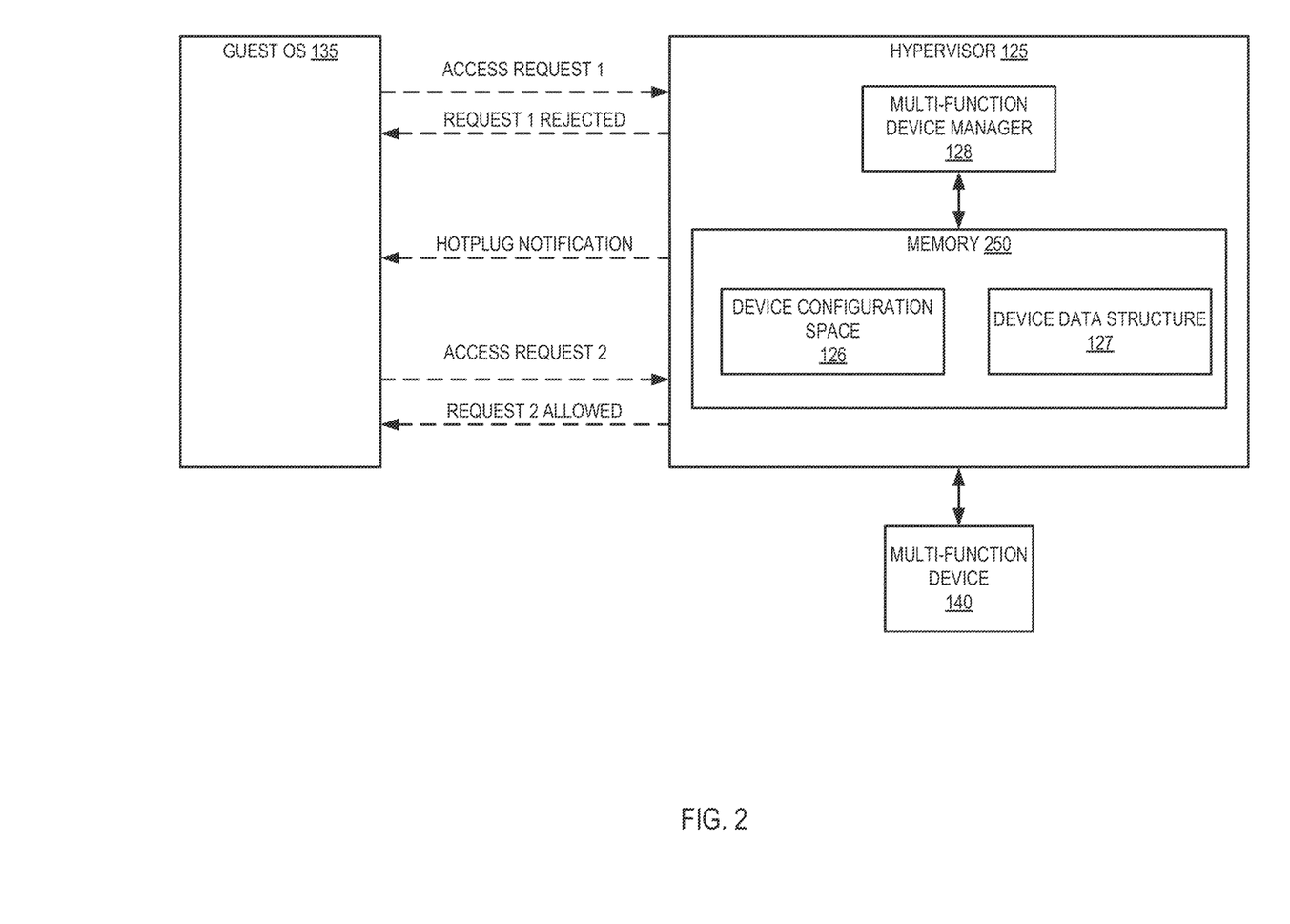
FIG. 2 depicts an example of an interaction between a hypervisor and guest OS where the guest OS attempts access of a configuration space associated with a multi-function device, in accordance with one or more aspects of the present disclosure.

FIG. 2 illustrates an example of an interaction between the hypervisor 125 and the guest OS 135, where the guest OS 135 attempts access of a configuration space associated with a multi-function device. The guest OS 135, hypervisor 125, and multi-function device 140 may be as described above with respect to FIG. 1.

In an illustrative example, guest OS 135 sends access request 1 to hypervisor 125 to attempt to access an address within configuration space 126 that is associated with multi-function device 140. Multi-function device manager 128 may intercept the request and determine whether multi-function device 140 is available to guest OS 135 as described below with respect to FIGS. 4-7. Multi-function manager may access device data structure 127 to identify an indicator of availability of the main function, and responsive to determining that multi-function device is not available, reject request 1.

Multi-function device manager 128 may subsequently send the hotplug notification to guest OS 135 once the main function of the multi-function device 140 is available for the guest OS 135. Responsive to receiving the hotplug notification, guest OS 135 may send access request 2 to obtain access to the configuration space associated with multi-function device 140. Multi-function device manager 128 can again intercept the request and determine whether multi-function device 140 is available to guest OS 135 as described below with respect to FIGS. 4-7. Multi-function manager may access device data structure 127 to identify an indicator of availability of the main function, and responsive to determining that multi-function device is now available, allow request 2.

Figure 3:
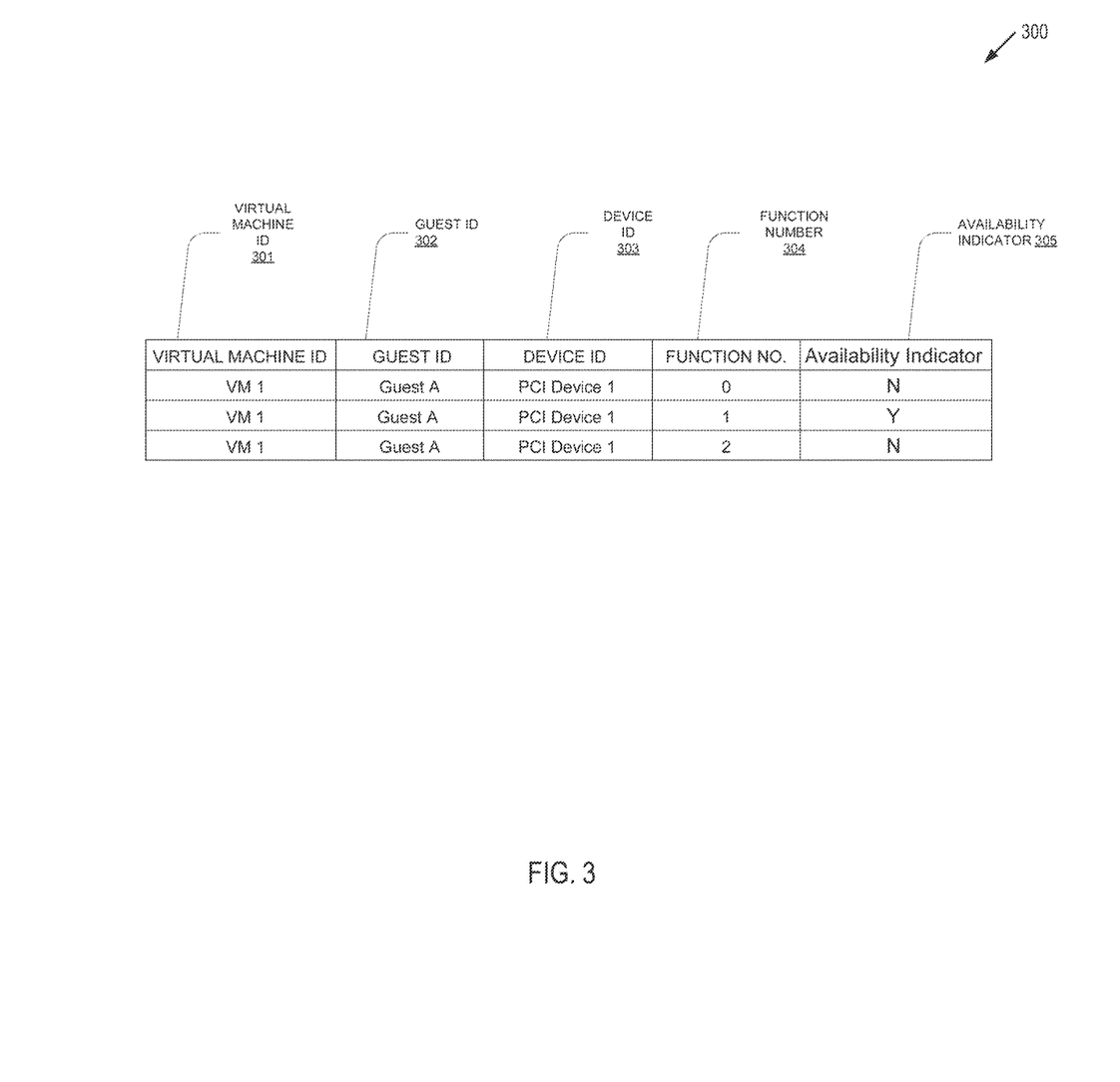
FIG. 3 depicts an example of a data structure associated with multi-function devices, in accordance with one or more aspects of the present disclosure.

FIG. 3 depicts a diagram of an example of a data structure 300 associated with a multi-function device. While, for simplicity, the data structure 300 is presented in FIG. 3 as a table data structure containing particular items, various embodiments can maintain the data structure 300 of other types (e.g., a file, a repository, etc.) and containing other data items. Data structure 300 illustrates a data structure associated with a multi-function device that includes a main function and two sub-functions.

Virtual machine ID 301 can include an identifier for the virtual machine to which the multi-function device may be assigned. Virtual machine ID 301 may be the process number of the executing virtual machine, or any other unique identifier. Guest ID 302 can include an identifier for guest OS that may be granted access to the applicable multi-function device. Device ID 303 includes an identifier describing the applicable multi-fun device. Device ID 303 may be the serial number of the device, a manufacturer ID, or any similar identifying information associated with the device. Function number 304 includes an identifier describing the applicable main function or sub-function for the multi-function device. For example, in implementations using PCI or PCI Express multi-function devices, the main function (e.g., function number zero) may be stored with function number 304 set to '0', and the sub-functions set to subsequent sequential numbers (e.g., '1', '2' etc.).

Availability indicator 305 can include information that indicates whether the corresponding main function or sub-function is available (e.g., initialization of the configuration space has been completed). Availability indicator 305 may be updated by a multi-function device manager of a hypervisor (e.g., multi-function device manager 128 of hypervisor 125 in FIG. 1) once initialization of the corresponding configuration space has completed, as described below with respect to FIGS. 4-7. As shown in FIG. 3, the configuration space for sub-function '1' has been completed (availability indicator 305='Y'), but the configuration space for sub-function '2' has not completed (availability indicator 305='N'). Since not all sub-functions have been initialized, availability indicator 305 for function number '0' remains set to 'N', indicating that the multi-function device is not available to Guest A. Once Function '2' has been initialized (and its corresponding availability indicator is set to 'Y'), the multi-function device manager may update the entry for function number '0' to change its availability indicator to 'Y' and subsequently permit access to the multi-function device by Guest A.

As shown in FIG. 3, data structure 300 is depicted for a single multi-function device that is exposed to a single guest OS of a VM. Thus, Virtual machine ID 301, Guest ID 302, and Device ID 303 each contain the same respective values for each function number 304. It should be noted that, for simplicity, a data structure for a single multi-function device has been depicted, in some implementations, data structure 300 may contain information for multiple multi-function devices. Alternatively, data structure 300 may only contain information for a single main function or sub-function associated with a multi-function device, yielding multiple separate data structures that can be associated with each other using the virtual machine ID 301, guest ID 302, and device ID 303.

Figure 4:
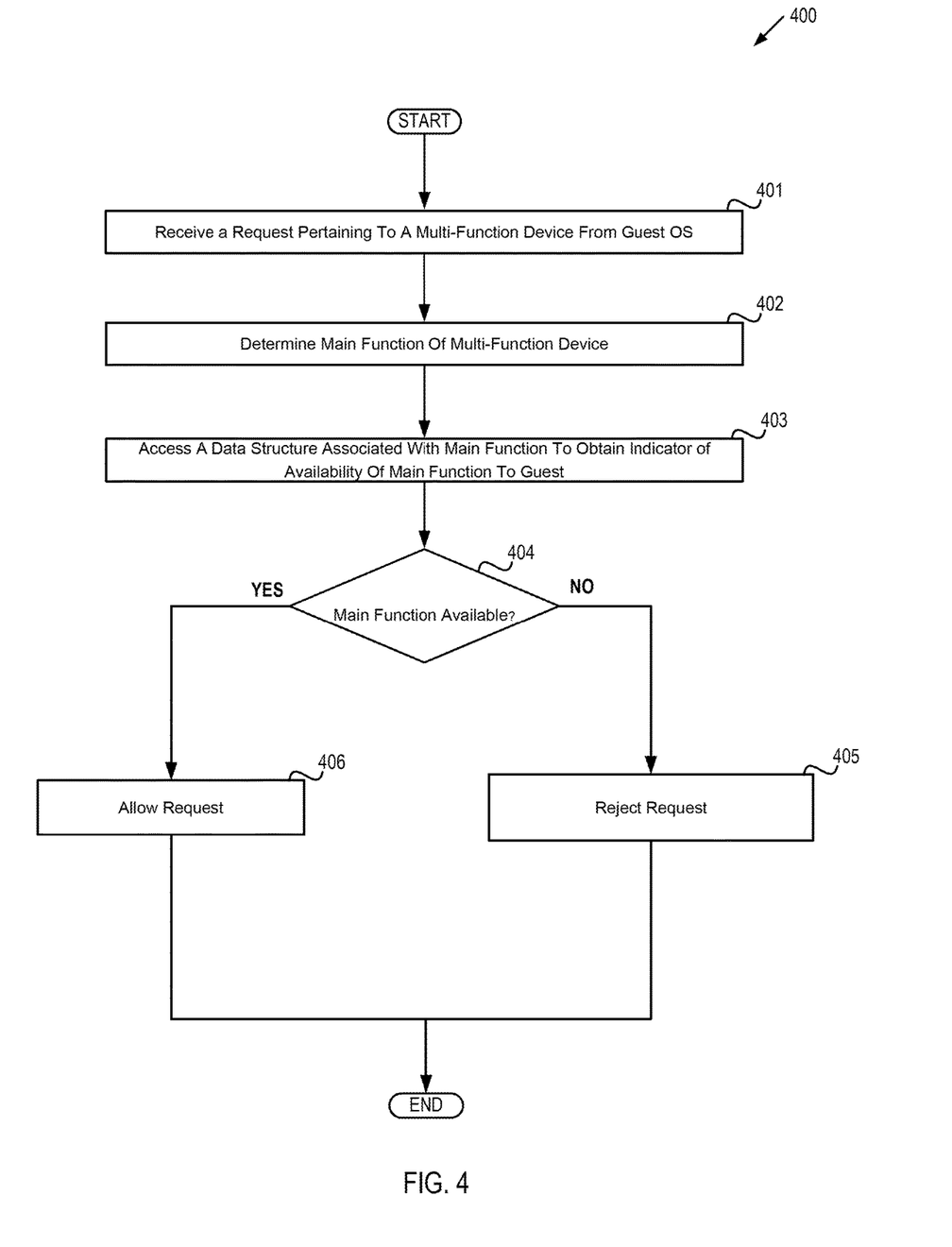
FIG. 4 depicts a flow diagram of a method for PCI slot hot-addition deferral for multi-function devices, in accordance with one or more aspects of the present disclosure

FIG. 4 depicts a flow diagram of an example method 400 for PCI slot hot-addition deferral for multi-function devices. The method may be performed by processing logic that may comprise hardware (circuitry, dedicated logic, etc.), software (such as is run on a general purpose computer system or a dedicated machine), or a combination of both. In one illustrative example, method 400 may be performed by multi-function device manager 128 of hypervisor 125 in FIG. 1. Alternatively, some or all of method 400 might be performed by another module or machine. It should be noted that blocks depicted in FIG. 4 could be performed simultaneously or in a different order than that depicted.

At block 401, processing logic can receive a request pertaining to a multi-function device from a guest OS of a virtual machine. In some implementations, the request may be a request to access the multi-function device. Additionally or alternatively, the request may identify an address within a configuration space associated with one of a plurality of sub-functions of the multi-function device. For example, the guest OS may initiate a scan of an address of hypervisor memory that includes one of the sub-functions of the multi-function device (e.g., a PCI scan of the address locations associated with a PCI bus).

At block 402, processing logic can determine the main function of the multi-function device in view of the address of the configuration space associated with the sub-function. In implementations involving a PCI multi-function device, processing logic may determine the function number zero of the PCI multi-function device associated with the address space of the sub-function. For example, if processing logic received a request from the guest pertaining to the first sub-function of a PCI multi-function device, it would then determine the function number zero for that device. Processing logic may make this determination by using the BDF for the sub-function and modifying the 3 bits of the function number portion of BDF deter nine the address of the function number zero.

At block 403, processing logic may then access a data structure associated with the main function of the multi-function device to obtain an indicator of availability of the main function to the guest. OS. In some implementations, processing logic may access the data structure using the address location of the main function as the index to the data structure to identify the proper data structure entry.

At block 404, processing logic may then determine, using the availability indicator, whether the main function is available to the guest OS. If the hypervisor is still in the process of initializing the sub-functions associated with the main function, the availability indicator may be set to a value indicating that the main function is not available to the guest OS of the VM. If, at block 404, processing logic determines that the main function is not available, processing continues to block 405.

At block 405, processing logic can reject the request from the guest OS to access the address within the configuration space associated with the sub-function. Processing logic may reject the request by sending an error code in an API, sending a direct message to the guest OS, returning a null address, or in any similar manner. In implementations using a PCI or PCI Express multi-function device, processing logic may return a response to the guest OS that simulates no response from the applicable PCI or PCI Express BDF address location (e.g., indicating, that no device is present at that BDF address). For example, processing may return an "all-bits-on" value ('FFFFFFFF' in hexadecimal) to the guest OS. The guest OS can interpret this response as if no device is available (e.g., no valid configuration space has been initialized) at the requested address location.

If, at block 404, processing logic determines that the main function is, available, processing continues to block 406. At block 406, processing logic can allow the request from the guest OS to access the address within the configuration space associated with the sub-function. After either block 405 or block 406, the method of FIG. 4 terminates.

Figure 5:
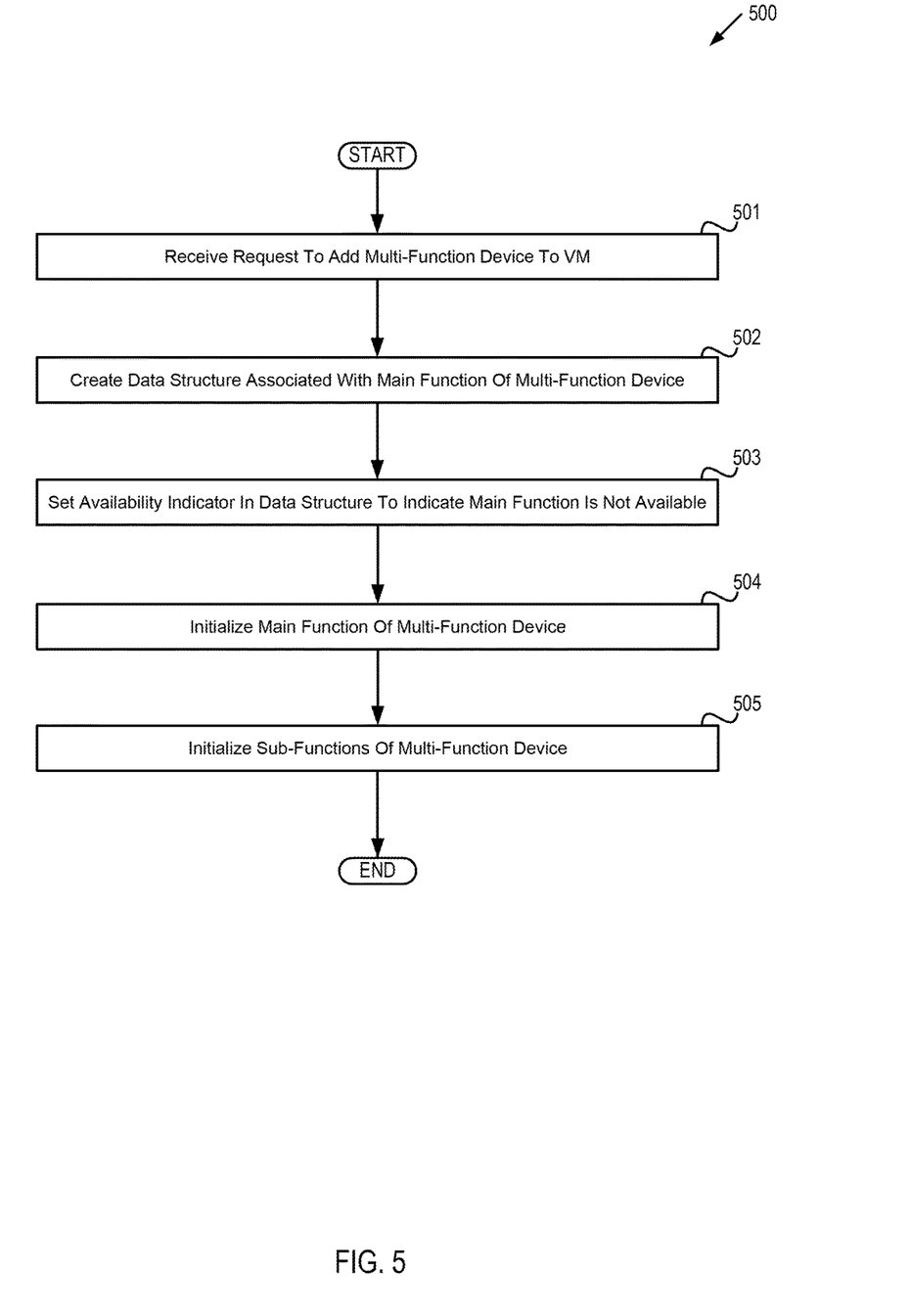
FIG. 5 depicts a flow diagram of a method for managing the data structure associated with a multi-function device, in accordance with one or more aspects of the present disclosure.

FIG. 5 depicts a flow diagram of an example method 500 for managing the data structure associated with a multi-function device. The method may be performed by processing logic that may comprise hardware (circuitry, dedicated logic, etc.), software (such as is run on a general purpose computer system or a dedicated machine), or a combination of both. In one illustrative example, method 500 may be performed by multi-function device manager 128 of hypervisor 125 in FIG. 1. Alternatively, some or all of method 500 might be performed by another module or machine. It should be noted that blocks depicted in FIG. 5 could be performed simultaneously or in a different order than that depicted.

At block 501, processing logic receives a request to add a multi-function device to a virtual machine. The request to add the device may be received from a hypervisor administrator via a management system interface for the hypervisor. Alternatively, the request may be received from another component of the system.

At block 502, processing logic creates a data structure associated with the main function of the multi-function device. The data structure may contain an availability indicator value for the main function of the multi-function device, an identifier for the virtual machine executing the guest OS (e.g., the process identifier for the VM) that may be granted access to the device, a unique identifier for the virtual device, the device type, or any similar information. In some implementations processing logic may create a single data structure for the multi-function device that stores information for the main function and the sub-functions together. Alternatively, processing logic may create a data structure for the main function that also includes references to separate data structures for each sub-function. The data structure may be maintained in hypervisor accessible memory, a shared memory space, stored in a storage device, or in any similar manner.

At block 503, processing logic sets an availability indicator in the data structure to a value that indicates that the main function of the multi-function device is not available to the guest OS of the virtual machine. In some implementations, when the data structure is created for the device, processing logic may create the availability indicator for the device with a default value that indicates that the main function is not available. For example, the availability indicator may be set to "N", "not available", "0", or the like. The availability indicator value may be numeric (e.g., "0", "1", etc.), alphanumeric (e.g., "Y", "N", etc.) a sting value (e.g., "available", "not available", etc.), or the like.

At block 504, processing logic initializes the main function of the multi-function device. To initialize the main function (e.g., function number zero for PCI and PCI express devices), processing logic may create a configuration space associated with the main function of the multi-function device. The configuration space may be created in hypervisor memory that can then be made available to the guest OS of the virtual machine for use in accessing the multi-function device.

Once the configuration space has been created, processing logic may then associate the main function a PCI function number zero) with a virtual PCI bus to be exposed to the virtual machine. In some implementations, processing logic may configure the configuration space so that a VM attempt to access the multi-function device via a virtual PCI bus can reference the allocated configuration space for that device in hypervisor memory. Processing logic may then associate the virtual PCI bus with the virtual machine. In some implementations, each function e.g., the main function and each sub-function) of a multi-function device may be associated with air initialization callback component (e.g., a PCI callback function component) that is executed upon successful completion of the initialization of the function. Processing logic may determine that initialization of the main function has completed responsive to successful execution of the initialization callback component.

At block 505, processing logic initializes each of the sub-functions associated with the main function. Processing logic may create an additional configuration space for each of the plurality of sub-functions for the multi-function device in a manner similar to that described above for the main function at block 504. Alternatively, processing logic may create a single configuration space shared among the additional sub-functions. Processing logic may create the configuration spaces serially (one at time) or in parallel (simultaneously). Once a configuration space has been created for a sub-function, processing logic may associate the sub-function with the PCI bus associated with the main function to be exposed to the VM. After block 505, the method of FIG. 5 terminates.

Figure 6:
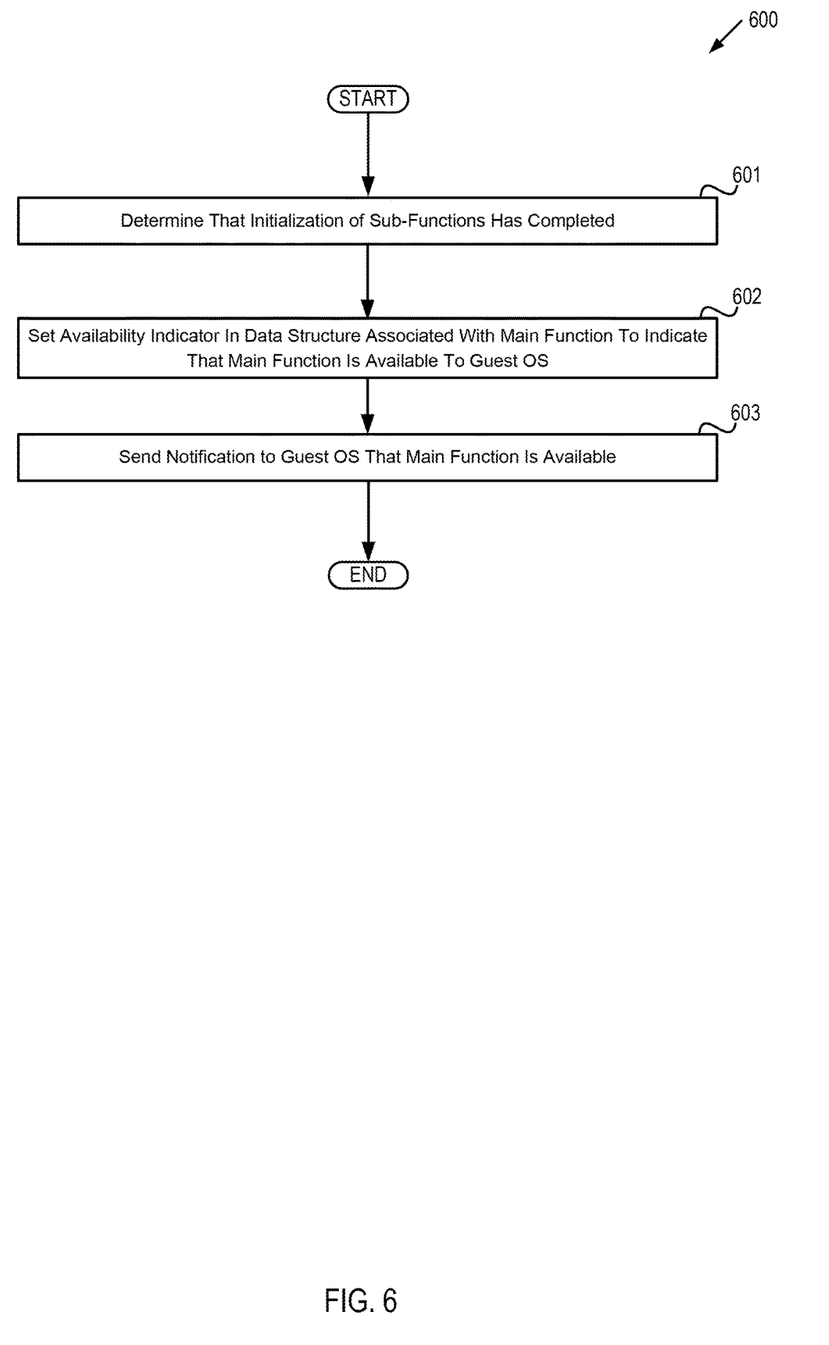
FIG. 6 depicts a flow diagram of a method for notifying a guest OS that a multi-function device is available, in accordance with one or more aspects of the present disclosure.

FIG. 6 depicts a flow diagram of an example method 600 for notifying a guest OS that a multi-function device is available. The method may be performed by processing logic that may comprise hardware (circuitry, dedicated logic, etc.), software (such as is run on a general purpose computer system or a dedicated machine), or a combination of both. In one illustrative example, method 600 may be performed by multi-function device manager 128 of hypervisor 125 in FIG. 1. Alternatively, some or all of method 600 might be performed by another module or machine. It should be noted that blocks depicted in FIG. 6 could be performed simultaneously or in a different order than that depicted.

At block 601, processing logic determines that initialization of the plurality of sub-functions associated with a multi-function device has completed. Processing logic may determine that initialization of the plurality of sub-function has completed responsive to successful execution of the corresponding initialization callback component for each of the sub-functions.

At block 602, processing logic sets the availability indicator in the data structure associated with the main function of the multi-function device to indicate that the main function is available to the guest OS. Processing logic may then set the availability indicator by modifying a flag in a data field of the data structure associated with the main function from "N" (not available) to "Y" available, modify a bit value from "0" (not available) to "1" (available), or in any similar manner.

At block 603, processing logic sends a notification to the guest OS that the main functions available. Processing logic may send the notification via an interrupt request, a message written to a data structure in a shared memory location, or in any similar manner. In some implementations, processing logic may send a PCI hotplug signal to the guest OS to notify the guest OS that a PCI multi-function device has been added to the VM. After block 603, the method of FIG. 6 terminates.

Figure 7:
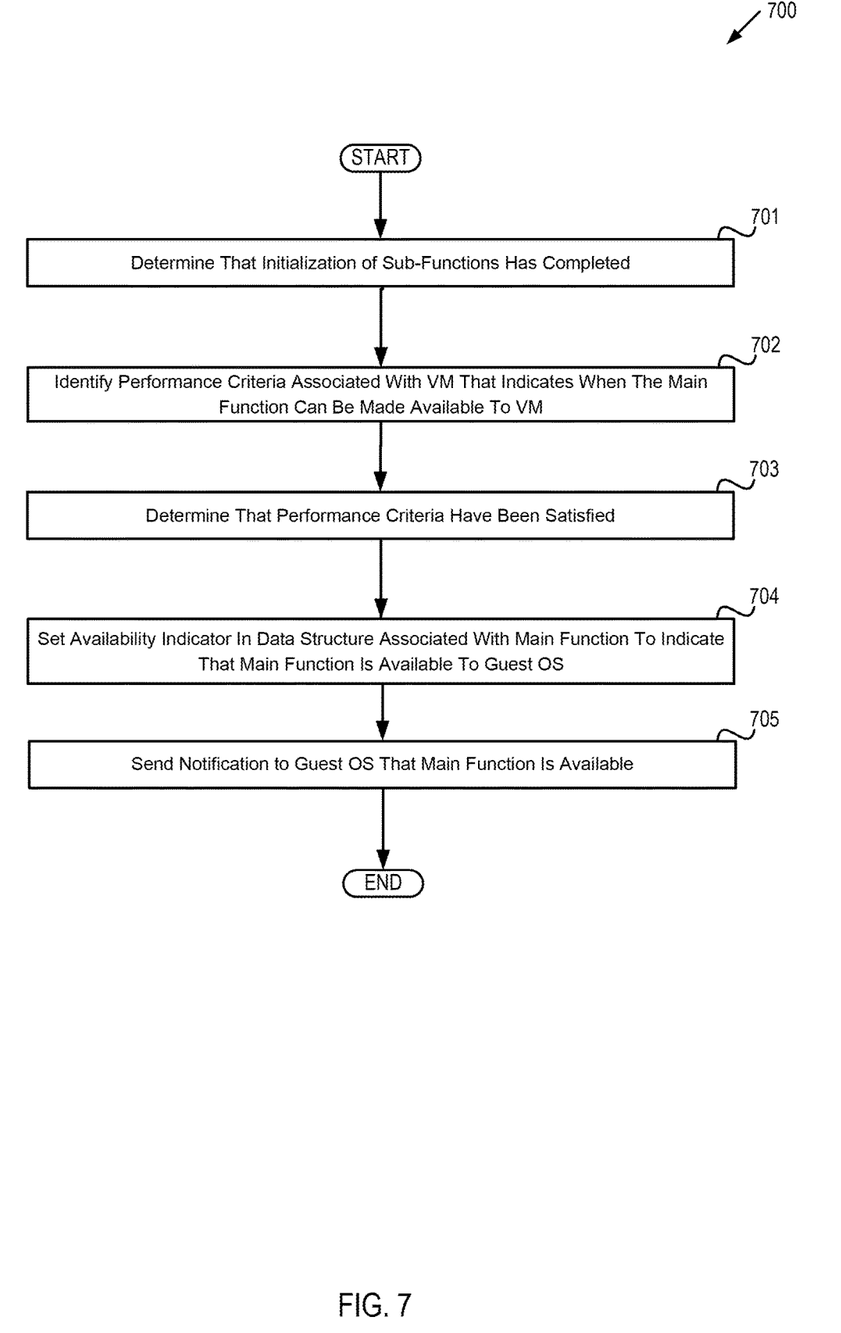
FIG. 7 depicts a flow diagram of a method for notifying a guest OS that a multi-function device is available after performance criteria has been satisfied, in accordance with one or more aspects of the present disclosure.

FIG. 7 depicts a flow diagram of an example method 700 for notifying a guest OS that a multi-function device is available after performance criteria has been satisfied. The method may be performed by processing logic that may comprise hardware (circuitry, dedicated logic, etc.), software (such as is run on a general purpose computer system or a dedicated machine), or a combination of both. In one illustrative example, method 700 may be performed by multi-function device manager 128 of hypervisor 125 in FIG. 1. Alternatively, some or all of method 700 might be performed by another module or machine. It should be noted that blocks depicted in FIG. 7 could be performed simultaneously or in a different order than that depicted.

At block 701, processing logic determines that initialization of the plurality of sub-functions associated with a multi-function device has completed. Processing logic may determine that initialization of the plurality of sub-function has completed responsive to successful execution of the corresponding initialization callback component for each of the sub-functions.

At block 702, processing logic identifies performance criteria associated with the virtual machine that indicates when the main function can be made available to the virtual machine. For example, processing logic may determine that the guest OS should only have access to the multi-function device after the VM has been restarted (e.g., after a scheduled maintenance cycle, after a scheduled downtime, etc.), during period where the load point of the VM is measured as comparatively low (e.g., when the CPU utilization of the VM is comparatively low), upon completion of a boot cycle the VM is not currently booting up), or the like. In some implementations, the performance criteria may be stored in a data structure associated with the VM. Alternatively, the performance criteria may be stored in the data structure associated with the main function of the multi-function device along with the availability indicator.

At block 703, processing logic determines that the performance criteria identified at block 702 have been satisfied. For example, processing logic may determine the VM has restarted, the CPU utilization rate is low, the VM is not currently booting up, etc. At block 704, processing logic sets the availability indicator in the data structure associated with the main function of the multi-function device to indicate that the main function is available to the guest OS. Processing logic may then set the availability indicator by modifying a flag in a data field of the data structure associated with the main function from "N" (not available) to "Y" available, modify a bit value from "0" (not available) to "1" (available), or in any similar manner.

At block 705, processing logic sends a notification to the guest OS that the main function is available. Processing logic may send the notification via an interrupt request, a message written to a data structure in a shared memory location, or in any similar manner. In some implementations, processing logic may send a PCI hotplug signal to the guest OS to notify the guest OS that a PCI multi-function device has been added to the VM. After block 705, the method of FIG. 7 terminates.

Figure 8:
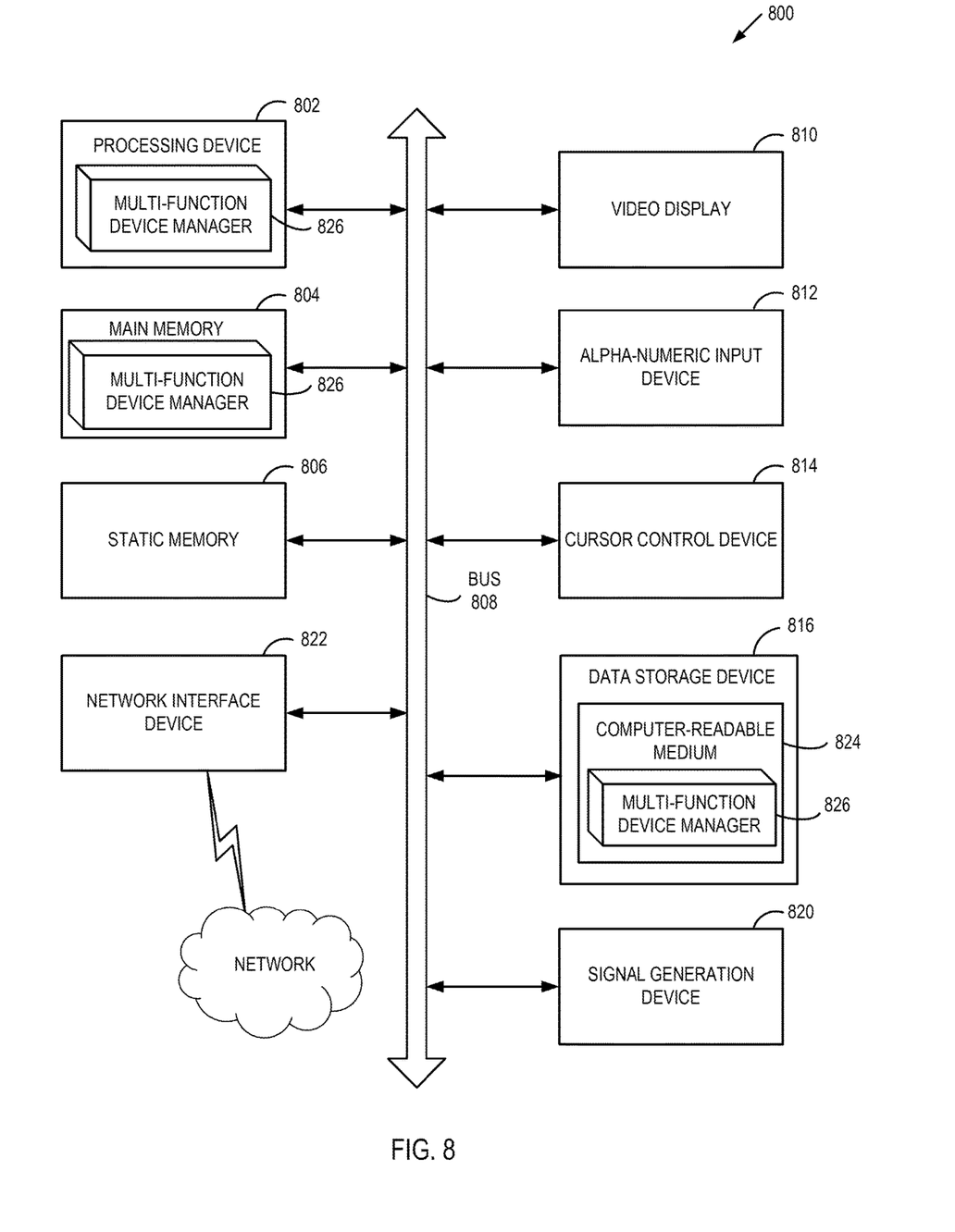
FIG. 8 depicts a block diagram of an illustrative computer system operating in accordance with examples of the invention.

FIG. 8 depicts an example computer system 800 which can perform any one or more of the methods described herein. In one example, computer system 800 may correspond to computer system 100 of FIG. 1. The computer system may be connected networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential of otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 800 includes a processing device 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816 which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute multi-function device manager 826 for performing the operations and steps discussed herein (e.g., corresponding to the methods of FIGS. 4-7, etc.).

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker). In one illustrative example, the video display unit 810, the alphanumeric input device 812, and the cursor control device 814 may be combined into a single component or device (e.g., an LCD touch screen).

The data storage device 816 may include a computer-readable medium 824 on which is stored multi-function device manager 826 (e.g., corresponding to the methods of FIGS. 4-7, etc.) embodying any one or more of the methodologies or functions described herein. Multi-function device manager 826 may also reside, completely or at least partially, within the main memory 804 and for within the processing device 802 during execution thereof by the computer system 800, the main memory 804 and the processing device 802 also constituting computer-readable media. Multi-function device manager 826 may further be transmitted or received over a network via the network interface device 822.

While the computer-readable storage medium 824 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "accessing," "rejecting," "creating," "setting," "associating," "sending," "identifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memoir ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth." etc. as used herein are meant as labels to distinguish among different elements and may not necessarily have an ordinal meaning according to their numerical designation.

What is claimed is:

1. A method comprising:
   receiving, by a processing device executing a hypervisor, a first request pertaining to a multi-function device managed by the hypervisor from a guest operating system of a virtual machine, the multi-function device comprising a main function and a plurality of sub-functions, the first request identifying an address within a configuration space associated with a sub-function of the plurality of sub-functions;

identifying a first portion of the address of the configuration space associated with the sub-function that indicates the sub-function of the plurality of sub-functions;

changing the first portion of the address that indicates the sub-function to a second portion of the address indicating the main function of the device;

accessing, by the hypervisor, a data structure associated with the main function using the second portion of the address to obtain an indicator of availability of the main function to the guest operating system;

determining whether the hypervisor is initializing at least one of the sub-functions of the plurality of sub-functions associated with the main function; and responsive to determining that the hypervisor is initializing at least one of the sub-functions of the plurality of sub-functions, rejecting, by the hypervisor, the first request.

2. The method of claim 1, further comprising:

receiving a second request to add the multi-function device to the virtual machine;

creating the data structure associated with the main function of the multi-function device; and setting the indicator of availability in the data structure associated with the main function to a first value that indicates that the main function is not available to the guest operating system.

3. The method of claim 2, further comprising:

initializing the main function of the multi-function device;

initializing the plurality of sub-functions associated with the main function; and responsive to determining that initialization of the plurality of sub-functions has completed, setting the indicator of availability in the data structure associated with the main function to a second value that indicates that the main function is available to the guest operating system.

4. The method of claim 3, wherein initializing the main function comprises:

creating the configuration space associated with the main function of the multi-function device;

associating the main function with a virtual Peripheral Component Interconnect (PCI) bus to be exposed to the virtual machine; and associating the virtual PCI bus with the virtual machine.

5. The method of claim 3, wherein initializing the plurality of sub-functions comprises:

creating an additional configuration space for each of the plurality of sub-functions of the multi-function device; and associating each sub-function with a virtual Peripheral Component Interconnect (PCI) bus to be exposed to the virtual machine.

6. The method of claim 3, further comprising:

sending a notification to the guest operating system that the main function is available to the guest operating system.

7. The method of claim 3, further comprising:

identifying performance criteria associated with the virtual machine that indicates when the main function can be made available to the virtual machine;

responsive to determining that the performance criteria has been satisfied, setting the availability indicator in the data structure associated with the main function to the second value that indicates that the main function is available to the guest operating system; and sending a notification to the guest operating system that the main function is available to the guest operating system.

8. A computing apparatus comprising:

a memory; and a processing device, operatively coupled to the memory, to execute a hypervisor to:

receive a first request pertaining to a multi-function device managed by the hypervisor from a guest operating system of a virtual machine, the multi-function device comprising a main function and a plurality of sub-functions, the first request identifying an address within a configuration space associated with a sub-function of the plurality of sub-functions;

identify a first portion of the address of the configuration space associated with the sub-function that indicates the sub-function of the plurality of sub-functions;

change the first portion of the address that indicates the sub-function to a second portion of the address indicating the main function of the device;

access a data structure associated with the main function using the second portion of the address to obtain an indicator of availability of the main function to the guest operating system;

determine whether the hypervisor is initializing at least one of the sub-functions of the plurality of sub-functions associated with the main function; and responsive to determining that the hypervisor is initializing at least one of the sub-functions of the plurality of sub-functions, reject the first request.

9. The apparatus of claim 8, wherein the processing device is further to:

receive a second request to add the multi-function device to the virtual machine;

create the data structure associated with the main function of the multi-function device; and set the indicator of availability in the data structure associated with the main function to a first value that indicates that the main function is not available to the guest operating system.

10. The apparatus of claim 9, wherein the processing device is further to:

initialize the main function of the multi-function device;

initialize the plurality of sub-functions associated with the main function; and responsive to determining that initialization of the plurality of sub-functions has completed, set the indicator of availability in the data structure associated with the main function to a second value that indicates that the main function is available to the guest operating system.

11. The apparatus of claim 10, wherein to initialize the main function, the processing device is to:

create the configuration space associated with the main function of the multi-function device;

associate the main function with a virtual Peripheral Component Interconnect (PCI) bus to be exposed to the virtual machine; and associate the virtual PCI bus with the virtual machine.

12. The apparatus of claim 10, wherein to initialize the plurality of sub-functions, the processing device is to:
create an additional configuration space for each of the plurality of sub-functions of the multi-function device; and
associate each sub-function with a virtual Peripheral Component Interconnect (PCI) bus to be exposed to the virtual machine.

13. The apparatus of claim 10, wherein the processing device is further to:
send a notification to the guest operating system that the main function is available to the guest operating system.

14. The apparatus of claim 10, wherein the processing device is further to:
identify performance criteria associated with the virtual machine that indicates when the main function can be made available to the virtual machine;
responsive to determining that the performance criteria has been satisfied, set the availability indicator in the data structure associated with the main function to the second value that indicates that the main function is available to the guest operating system; and
send a notification to the guest operating system that the main function is available to the guest operating system.

15. A non-transitory computer readable storage medium, having instructions stored therein, which when executed by a processing device of a computer system, cause the processing device to:
receive, by the processing device executing a hypervisor, a first request to add a multi-function device managed by the hypervisor to a virtual machine, the multi-function device comprising a main function and a sub-function of a plurality of sub-functions;
create, by the hypervisor, a data structure associated with the main function of the multi-function device;
set, by the hypervisor, an indicator of availability in the data structure associated with the main function to a first value that indicates that the main function is not available to a guest operating system of the virtual machine;
receive, by the hypervisor, a second request pertaining to the multi-function device from the guest operating system of the virtual machine, the second request identifying an address within a configuration space associated with the sub-function of the multi-function device;
identify a first portion of the address of the configuration space associated with the sub-function that indicates the sub-function of the plurality of sub-functions;
change the first portion of the address that indicates the sub-function to a second portion of the address indicating the main function of the device;
access, by the hypervisor, the data structure associated with the main function using the second portion of the address to obtain the indicator of availability of the main function to the guest operating system;
determine whether the hypervisor is initializing at least one of the sub-functions of the plurality of sub-functions associated with the main function; and
responsive to determining that the hypervisor is initializing at least one of the sub-functions of the plurality of sub-functions, reject, by the hypervisor, the second request.

16. The non-transitory computer readable storage medium of claim 15, wherein the processing device is further to:
initialize the main function of the multi-function device;
initialize the plurality of sub-functions associated with the main function; and
responsive to determining that initialization of the plurality of sub-functions has completed, set the indicator of availability in the data structure associated with the main function to a second value that indicates that the main function is available to the guest operating system.

17. The non-transitory computer readable storage medium of claim 16, wherein to initialize the main function, the processing device is to:
create the configuration space associated with the main function of the multi-function device;
associate the main function with a virtual Peripheral Component Interconnect (PCI) bus to be exposed to the virtual machine; and
associate the virtual PCI bus with the virtual machine.

18. The non-transitory computer readable storage medium of claim 16, wherein to initialize the plurality of sub-functions, the processing device is to:
create an additional configuration space for each of the plurality of sub-functions of the multi-function device; and
associate each sub-function with a virtual Peripheral Component Interconnect (PCI) bus to be exposed to the virtual machine.

19. The non-transitory computer readable storage medium of claim 16 wherein the processing device is further to:
send a notification to the guest operating system that the main function is available to the guest operating system.

20. The non-transitory computer readable storage medium of claim 16 wherein the processing device is further to:
identify performance criteria associated with the virtual machine that indicates when the main function can be made available to the virtual machine;
responsive to determining that the performance criteria has been satisfied, set the availability indicator in the data structure associated with the main function to the second value that indicates that the main function is available to the guest operating system; and
send a notification to the guest operating system that the main function is available to the guest operating system.

* * * * *